United States Patent
Kato

(10) Patent No.: US 10,211,645 B2
(45) Date of Patent: Feb. 19, 2019

(54) NON-CONTACT POWER SUPPLY DEVICE

(71) Applicant: TOSHIBA TEC KABUSHIKI KAISHA, Tokyo (JP)

(72) Inventor: Masakazu Kato, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 409 days.

(21) Appl. No.: 14/857,119

(22) Filed: Sep. 17, 2015

(65) Prior Publication Data
US 2016/0094046 A1 Mar. 31, 2016

(30) Foreign Application Priority Data
Sep. 25, 2014 (JP) .................. 2014-194837

(51) Int. Cl.
*H02J 5/00* (2016.01)
*H02J 17/00* (2006.01)
*H02J 7/02* (2016.01)
*H02M 1/12* (2006.01)
*H02M 3/337* (2006.01)

(52) U.S. Cl.
CPC .............. *H02J 5/005* (2013.01); *H02J 7/025* (2013.01); *H02J 17/00* (2013.01); *H02M 1/12* (2013.01); *H02M 3/337* (2013.01); *Y02B 70/1433* (2013.01)

(58) Field of Classification Search
CPC ...................................................... H02J 5/005
See application file for complete search history.

(56) References Cited

U.S. PATENT DOCUMENTS

| | | |
|---|---|---|
| 6,972,543 B1 | 12/2005 | Wells |
| 7,182,266 B2 | 2/2007 | Yoshinaga et al. |
| 7,741,734 B2 | 6/2010 | Joannopoulos et al. |
| 7,825,543 B2 | 11/2010 | Karalis et al. |

(Continued)

FOREIGN PATENT DOCUMENTS

| | | |
|---|---|---|
| CN | 102239633 A | 11/2011 |
| CN | 103580299 A | 2/2014 |

(Continued)

OTHER PUBLICATIONS

Japanese Office Action dated Feb. 20, 2018, filed in Japanese counterpart Application No. 2014-194837, 6 pages (with translation).

(Continued)

*Primary Examiner* — Jeffrey Shin
(74) *Attorney, Agent, or Firm* — Kim & Stewart LLP

(57) ABSTRACT

A non-contact power supply device, which supplies electric power to a power reception coil from a power transmission coil in a non-contact manner, includes a power transmission coil, a power transmission circuit switchably coupling a voltage source to the power transmission coil, the power transmission circuit configured to resonate at a fundamental frequency, and a serial LC resonant circuit in parallel with the power transmission coil, and configured to resonate at a frequency of a harmonic wave of the fundamental frequency. The non-contact power supply device suppresses a harmonic wave noise by providing a resonant circuit that resonates at a specific harmonic wave.

20 Claims, 8 Drawing Sheets

(56) References Cited

U.S. PATENT DOCUMENTS

| | | |
|---|---|---|
| 8,022,576 B2 | 9/2011 | Joannopoulos et al. |
| 8,169,185 B2 | 5/2012 | Partovi et al. |
| 9,106,096 B2 | 8/2015 | Kato |
| 9,473,210 B2 | 10/2016 | Komiyama |
| 2007/0284357 A1 | 12/2007 | Takahashi et al. |
| 2011/0049995 A1 | 3/2011 | Hashiguchi |
| 2011/0069518 A1 | 3/2011 | Shin et al. |
| 2012/0326524 A1 | 12/2012 | Matsumoto et al. |
| 2013/0099586 A1 | 4/2013 | Kato |
| 2014/0035364 A1* | 2/2014 | Uramoto ............... H01F 38/14 307/17 |
| 2014/0191584 A1 | 7/2014 | Kato |
| 2015/0015080 A1 | 1/2015 | Kato et al. |
| 2015/0015082 A1 | 1/2015 | Kanagawa et al. |
| 2015/0194811 A1* | 7/2015 | Mao ....................... H02J 7/025 307/104 |

FOREIGN PATENT DOCUMENTS

| | | |
|---|---|---|
| CN | 105874700 A | 8/2016 |
| JP | 2005026741 A | 1/2005 |
| JP | 2013223409 A | 10/2013 |
| KR | 20140014502 A | 2/2014 |
| WO | 2010/053011 A1 | 5/2010 |
| WO | 2013005375 A1 | 1/2013 |

OTHER PUBLICATIONS

Chinese Office Action dated Jul. 3, 2017, filed in Chinese counterpart Application No. 201510555687.X, 19 pages (with translation).
Chinese Office Action dated Dec. 5, 2017, filed in Chinese counterpart Application No. 201510555687.X, 16 pages (with translation).

\* cited by examiner

NON-CONTACT POWER SUPPLY DEVICE

CROSS-REFERENCE TO RELATED APPLICATION

This application is based upon and claims the benefit of priority from Japanese Patent Application No. 2014-194837, filed Sep. 25, 2014, the entire contents of which are incorporated herein by reference.

FIELD

Embodiments described herein relate generally to a non-contact power supply device that supplies electric power to a power reception device from a power transmission device in a non-contact state.

BACKGROUND

In recent years, a non-contact power supply device that supplies electric power in a non-contact state is widely used. The non-contact power supply device supplies electric power to a power reception device, such as a portable terminal and a tablet terminal, from a power transmission device in a non-contact state through electromagnetic coupling, such as an electromagnetic induction or a magnetic field resonance. The non-contact power supply device includes a power transmission circuit and a power transmission coil to transmit electric power. The power reception device includes a power reception coil for receiving electric power, a power reception circuit for using the received electric power and driving the power reception device, and a charging circuit for charging a secondary battery that is equipped with the power reception device.

In the non-contact power supply device, in order to supply the electric power to the power reception device from the power transmission device even in a case where devices are separated from each other more than 1 centimeter (cm) or 2 cm, a switching frequency having several megahertz (MHz) or more may be used in some cases. Such a switching frequency increases a quality (Q) value of a coil. For example, the switching frequency having 6.78 MHz or the switching frequency having 13.56 MHz is used. By increasing the Q value of the coil, it is possible to efficiently supply the electric power even when the power transmission coil and the power reception coil are far away from each other.

In the non-contact power supply device, it is possible to supply the electric power with respect to the power reception device with high efficiency, but it is necessary to suppress a radiation noise. In order to suppress the radiation noise, in some cases, an amplifier using a resonance, such as a class E amplifier that reduces a switching loss through zero-voltage switching (ZVS) or zero-current switching (ZCS), is used as the power transmission circuit of the non-contact power supply device. ZVS is a technique for switching a switching element such as a MOSFET in a zero-voltage state, and ZCS is a technique for switching a switching element such as a MOSFET in zero-current state. The ZVS and ZCS techniques are referred to as soft switching. The soft switching may reduce the switching loss, and realize the power transmission circuit with high efficiency.

In the non-contact power supply device in which the electric power may be supplied to the power reception device from the power transmission device even in a case where the power transmission coil and the power reception coil are separated from each other more than 1 cm or 2 cm, or more than several cm, the power reception coil is not tightly coupled with the power transmission coil. Thus, it is likely that electromagnetic waves are radiated to a space from the power transmission coil. In order to reduce the radiation noise radiated to the space from the power transmission coil, a low pass filter can be inserted into a previous stage of the power transmission coil to reduce harmonic components. However, since the amplifier in the non-contact power supply device performs the soft switching such as the ZVS or the ZCS by using an inductance (L) value of the power transmission coil and an inductance-capacitance (LC) resonance, insertion of an LC filter changes the resonance condition. Thus, the soft switching may operate incorrectly. As a result, there is a problem in that the circuit may operate incorrectly. In addition, in order for the resonance condition to remain unchanged in when the LC filter is inserted, a circuit constant is required to be reset. However, it can be difficult to adjust the circuit constant.

An induction heating device is a known device including the power transmission circuit that is used as a non-contact power supply device. The power transmission circuit in the non-contact power supply device of the induction heating device is configured such that the electric power is supplied to the power transmission coil from a high-frequency inverter that includes a switching element driven by a two-phase oscillator. The harmonic components radiated from the power transmission coil are reduced, and thus an L-type resonance circuit that includes an inductor and a capacitor is provided between the switching element and the power transmission coil. The L-type resonance circuit functions as the low pass filter. The switching frequency of the induction heating device is set as 80 kilohertz (KHz).

Since the resonance frequency of the L-type resonance circuit that functions as the low pass filter is required to be lower than the switching frequency, it is necessary that the inductors have relatively large values and be connected between the switching element and the power transmission coil in series. Since the large-value inductors are used, it is not possible to supply a sufficient electric current to the power transmission coil. As a result, the supplied power is also decreased.

DETAILED DESCRIPTION

Figure 1:
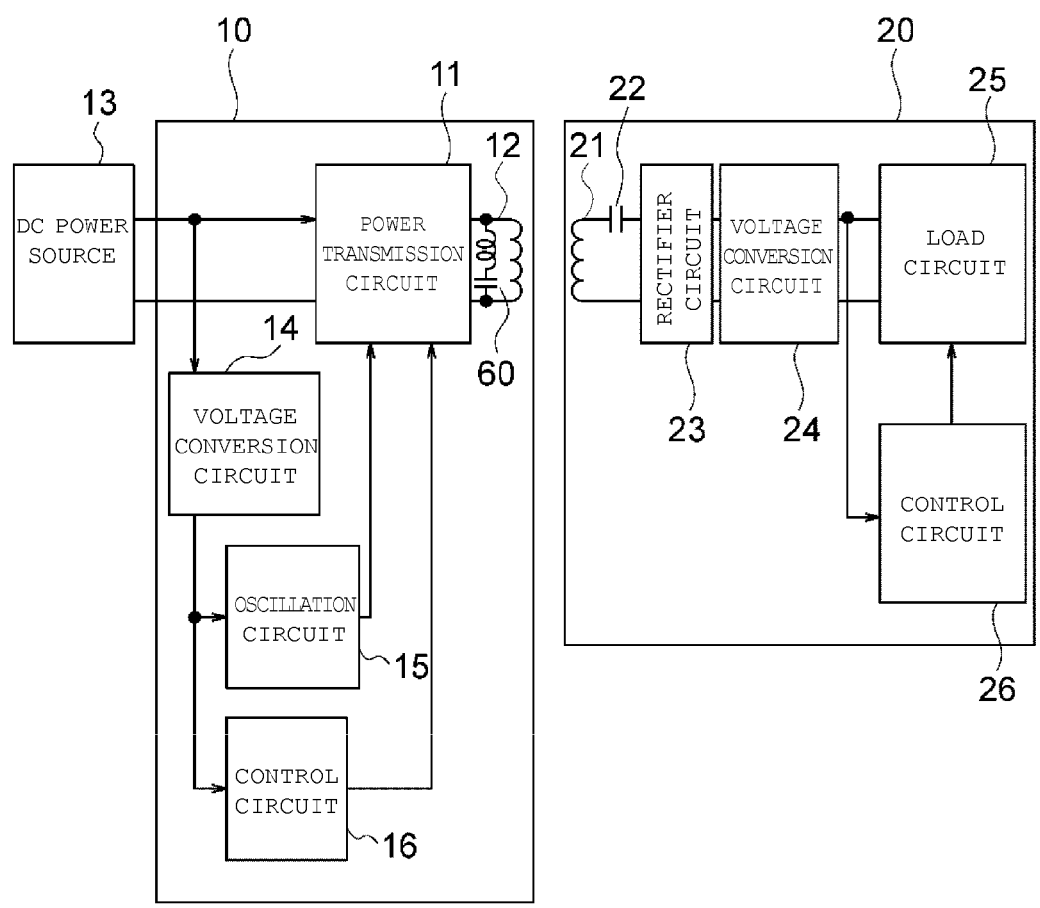
FIG. 1 is a block diagram illustrating a configuration of non-contact power supply system according to a first embodiment.

As described above, there is a problem in that a low pass filter that includes an inductor and a capacitor cannot not easily inserted into a resonance circuit of an amplifier in a non-contact power supply device without changing a resonance condition, and thus it is not easy to reduce a radiation noise of the non-contact power supply device.

The exemplary embodiments herein provide a non-contact power supply device that uses an amplifier as a power transmission circuit for performing soft switching, such as zero-voltage switching (ZVS) or zero-current switching (ZCS), to suppress harmonic wave noise radiated from a power transmission coil.

In general, according to one embodiment, a non-contact power supply device, which supplies electric power to a power reception coil from a power transmission coil in a non-contact manner, includes a power transmission coil, a power transmission circuit switchably coupling a voltage source to the power transmission coil, the power transmission circuit configured to resonate at a fundamental frequency, and a serial LC resonant circuit in parallel with the power transmission coil. The serial LC resonant circuit is configured to resonate at a frequency of a harmonic wave of the fundamental frequency. Electric power is supplied to the power reception coil from the power transmission coil through electromagnetic coupling.

Hereinafter, the exemplary embodiments will be described with reference to the drawings. Note that common reference numerals indicate the same structure or similar structure in the drawings.

(First Embodiment)

FIG. 1 is a block diagram illustrating a configuration including a power supply device and a power reception device of a non-contact power supply system according to the first embodiment. As illustrated in FIG. 1, the non-contact power supply system includes a non-contact power supply device 10 that supplies electric power, and a power reception device 20 that receives the supplied electric power. The non-contact power supply device 10 includes a power transmission circuit 11 and a power transmission coil 12. The power reception device 20 includes a power reception coil 21. The electric power that is output from the non-contact power supply device 10 is supplied to the power reception device 20 through electromagnetic coupling, such as an electromagnetic induction or a magnetic field resonance, between the power transmission coil 12 and the power reception coil 21.

A direct current (DC) power is supplied to the non-contact power supply device 10 from the outside via a DC power source 13 such as an alternating current (AC) adaptor. The non-contact power supply device 10 includes a power transmission circuit 11 that generates a high-frequency power, a serial LC resonant circuit 60, a power transmission coil 12, a voltage conversion circuit 14, an oscillation circuit 15, and a control circuit 16.

Figure 2:
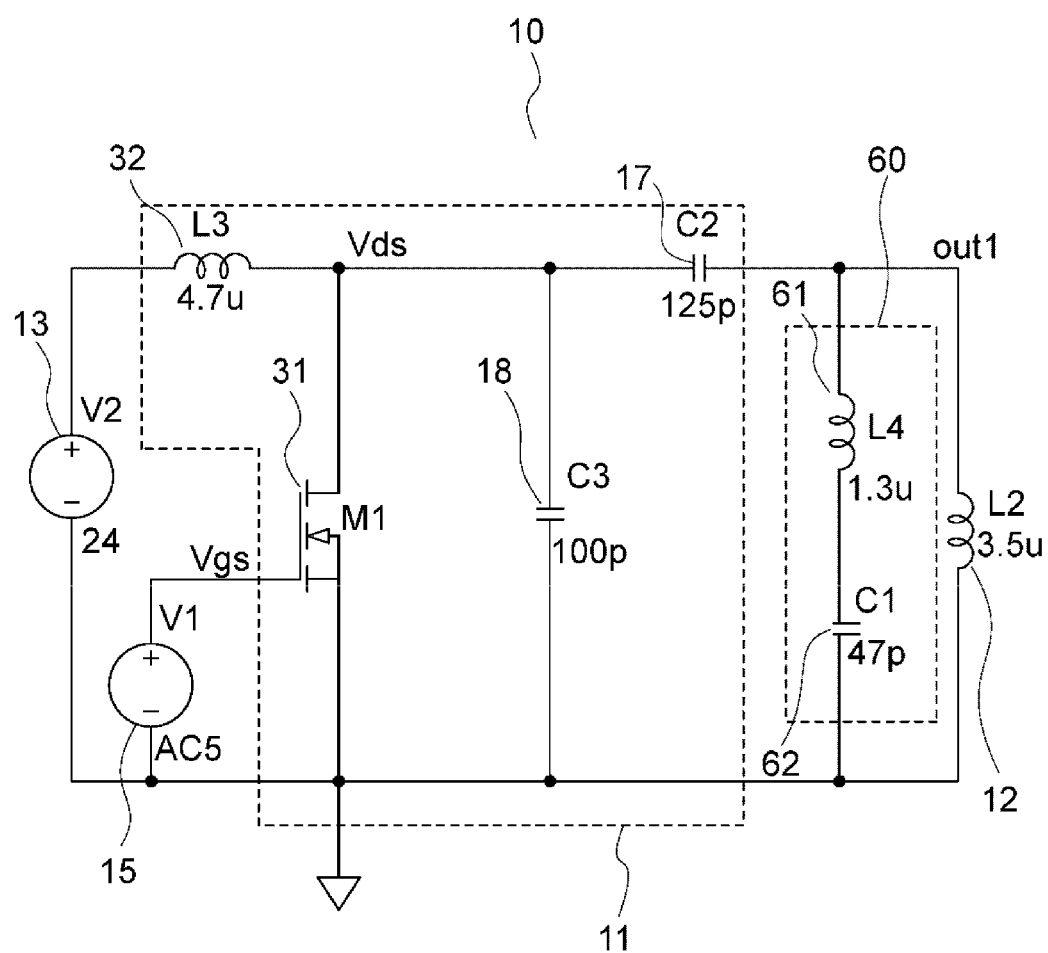
FIG. 2 is a configuration diagram schematically illustrating a transmission circuit in a non-contact power supply device according to the first embodiment.

FIG. 2 illustrates a circuit configuration of the non-contact power supply device 10 that includes the power transmission circuit 11. The power transmission circuit 11 includes a metal-oxide semiconductor field effect transistor (MOSFET) 31 as a switching element, and the DC power is supplied to the power transmission circuit 11 from the DC power source 13 via a choke coil 32. The DC power source 13 outputs a voltage of 24 volts (V), of which the positive side is connected to the choke coil 32, and the negative side is grounded. A capacitor 17 and the power transmission coil 12 are connected to each other in series, and a capacitor 18 is connected in parallel with the capacitor 17 and the power transmission coil 12, which are connected to each other in series. The capacitor 18 is connected in parallel with the MOSFET 31.

The MOSFET 31 is turned on and off by an output of the oscillation circuit 15. A resonance circuit includes the power transmission coil 12 and the capacitors 17 and 18. The resonance circuit performs a resonance operation in accordance with turning on and off of the MOSFET 31. That is, a configuration of a class E amplifier, which performs zero-voltage switching (ZVS), is employed in such a manner that the MOSFET 31 is turned on when a drain voltage Vds of the MOSFET 31 becomes zero. The zero-voltage switching (ZVS) operates as soft switching. The choke coil 32 is set as 4.7 microhenries (μH), the power transmission coil 12 is set as 3.5 μH, the capacitor 17 is set as 125 picofarads (pF), and the capacitor is set as 100 pF. An oscillating frequency of the oscillation circuit 15, that is a switching frequency of the MOSFET 31, is set as 6.78 MHz.

The soft switching is a technique for switching on/off of a switching element (MOSFET 31) by using a resonance phenomenon at the timing at which the voltage or current becomes zero. Due to this, it is possible to reduce a switching loss. In addition, since a voltage waveform or a current waveform is gradually changed, it is possible to reduce a switching noise, a conductive noise, and the radiation noise. For this reason, it is possible to reduce the size of a capacitor or an inductor by increasing the switching frequency.

Meanwhile, the oscillating frequency of the oscillation circuit 15 is the same or substantially the same as a self-resonant frequency of the resonance circuit comprising the power transmission coil 12 and the capacitors 17 and 18.

A serial LC resonant circuit 60, which includes an inductor 61 and a capacitor 62, reduces a specific higher harmonic wave and is provided in the non-contact power supply device 10. The serial LC resonant circuit 60, which resonates at the harmonic wave to be reduced, and in which the inductor 61 and the capacitor 62 are connected to each other in series, is connected in parallel with the power transmission coil 12. In order to reduce gain of the 20.34 MHz harmonic wave, which is three times greater than the switching frequency of 6.78 MHz, the inductor 61 is set as 1.3 μH, the capacitor 62 is set as 47 pF, and then the resonance is performed at 20.34 MHz. Here, a value of a resonance frequency (f60) of the serial LC resonant circuit 60 is calculated by the following equation:

$$f60 = 1/2\pi\sqrt{LC} = 20.37 \text{ MHz} \approx 20.34 \text{ MHz}$$

From the viewpoint of securing a distance between the power transmission coil 12 and the power reception coil 21 more than 1 cm or 2 cm, the switching frequency of several MHz to tens of MHz is used in many cases. Specifically, the switching frequency of 6.78 MHz or 13.56 MHz is used. When the distance between the power transmission coil 12 and the power reception coil 21 is short, it is possible to apply the configuration of the exemplary embodiment with respect to the frequency of about several tens of kHz to several hundreds of kHz. Here, a value of the inductance and a value of the capacitance are different from each other in accordance with the frequency.

The voltage conversion circuit 14 converts a voltage that is input from the DC power source 13 into a proper voltage by which the oscillation circuit 15 and the control circuit 16 may be operated. The output of the DC power source 13 is 24 V and is converted into the voltage of 5 V or 3.3 V by the voltage conversion circuit 14.

The control circuit 16 is a microcomputer. The control circuit 16 performs control for starting or stopping an operation of the power transmission circuit 11 if necessary, or performs communication control between the power transmission circuit 11 and the power reception device 20.

The power reception device 20 includes a resonant element, which includes a power reception coil 21 and a capacitor 22, a rectifier circuit 23, a voltage conversion circuit 24, a load circuit 25, and a control circuit 26. The rectifier circuit 23 converts an AC voltage that is generated by the resonant element into a DC voltage. The voltage conversion circuit 24 converts the DC voltage that is output from the rectifier circuit 23 into a desired AC voltage. The control circuit 26 controls the load circuit 25.

A self-resonance frequency of the resonant element that includes the power reception coil 21 and the capacitor 22 in the power reception device 20 is the same or substantially the same as the switching frequency of the MOSFET 31 of the power transmission device 11. That is, the self-resonance frequency and the switching frequency are set as 6.78 MHz. The power transmission coil 12 in the non-contact power supply device 10 and the power reception coil 21 in the power reception device 20 are electromagnetically coupled, whereby the electric power is efficiently transmitted to the reception side from the power transmission side.

The load circuit 25 is a circuit of electronic equipment, such as a portable terminal or a tablet terminal. The electric power received from the power reception device 20 is used for operation of the electronic equipment, or for charging a battery that is built in the electronic equipment. The control circuit 26 is a microcomputer. The control circuit 26 performs control for supplying or stopping the received electric power to the load circuit 25 if necessary, or performs communication control between the load circuit 25 and the non-contact power supply device 10.

Figure 3:
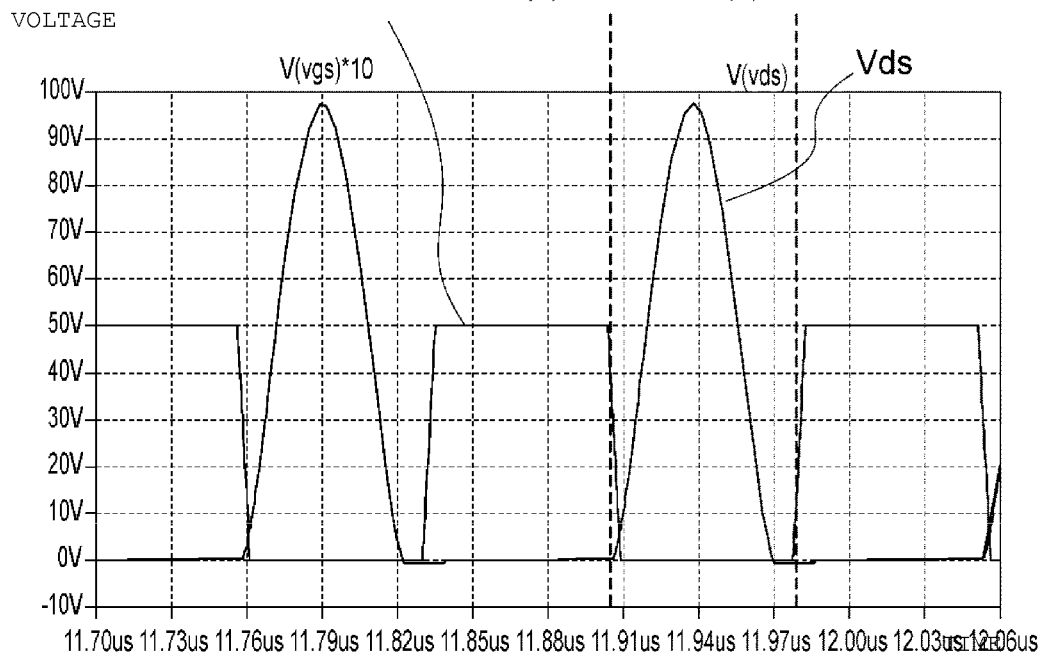
FIG. 3 is a diagram illustrating a zero-voltage switching (ZVS) operating waveform of a power transmission circuit in the non-contact power supply device according to the first embodiment.

A power transmission operation of the non-contact power supply device 10 will be described. FIG. 3 is a simulation waveform, which illustrates a waveform of the voltage Vgs for switching the MOSFET 31 and an output voltage (a drain voltage) Vds of the MOSFET 31.

The switching frequency of the power transmission circuit 11 is set as 6.78 MHz. A wavelength of an operation performed at 6.78 MHz is 0.147 microseconds (μs), and the output voltage Vgs of the oscillation circuit 15 is formed into a square wave of which the wavelength is 0.147 μs. In FIG. 3, (a) represents a timing for turning off the MOSFET 31, and (b) represents a timing for turning on the MOSFET 31. At the timing of (a), a value of the voltage Vgs is changed from 5 V to 0 V. At the timing of (b), the MOSFET 31 is turned on when the drain voltage Vds becomes 0 V, and then the value of the voltage Vgs is changed from 0 V to 5 V. In addition, in FIG. 3, a horizontal axis represents a time, a vertical axis represents a voltage, and the voltage Vgs is multiplied by ten. The voltage Vgs is turned on and the electric current starts to flow into the MOSFET 31. In this way, the MOSFET 31 is turned on when the drain voltage Vds becomes 0 V, and thus this operation is called the zero-voltage switching (ZVS), which has an advantage of reducing the switching loss.

Figure 4:
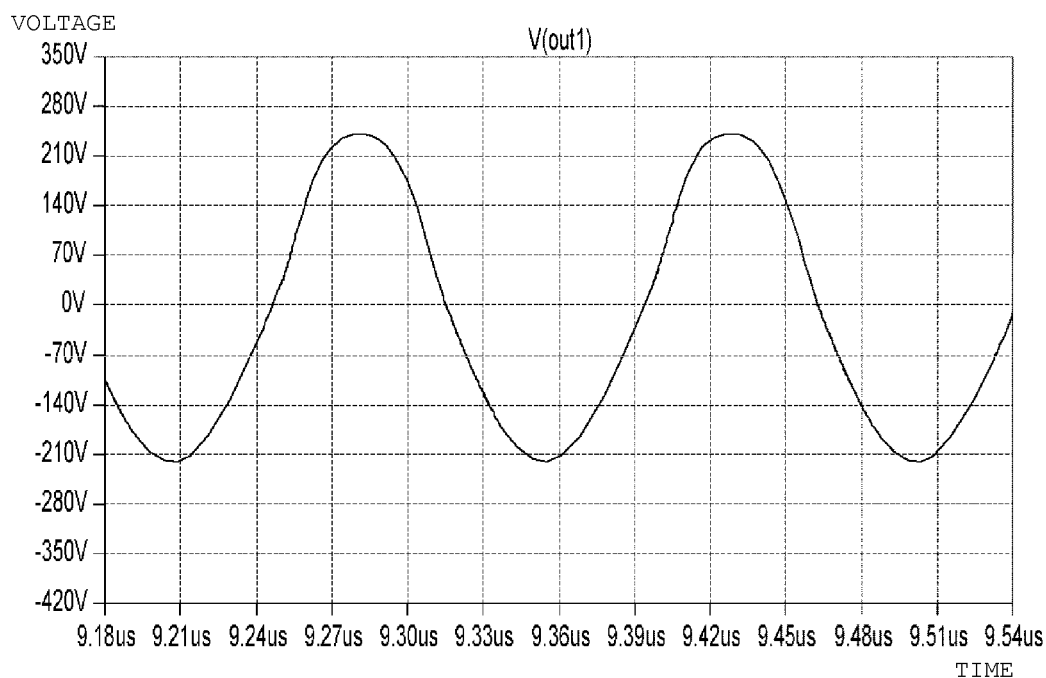
FIG. 4 is a diagram illustrating a voltage waveform of a power transmission coil in the non-contact power supply device according to the first embodiment.
Figure 5:
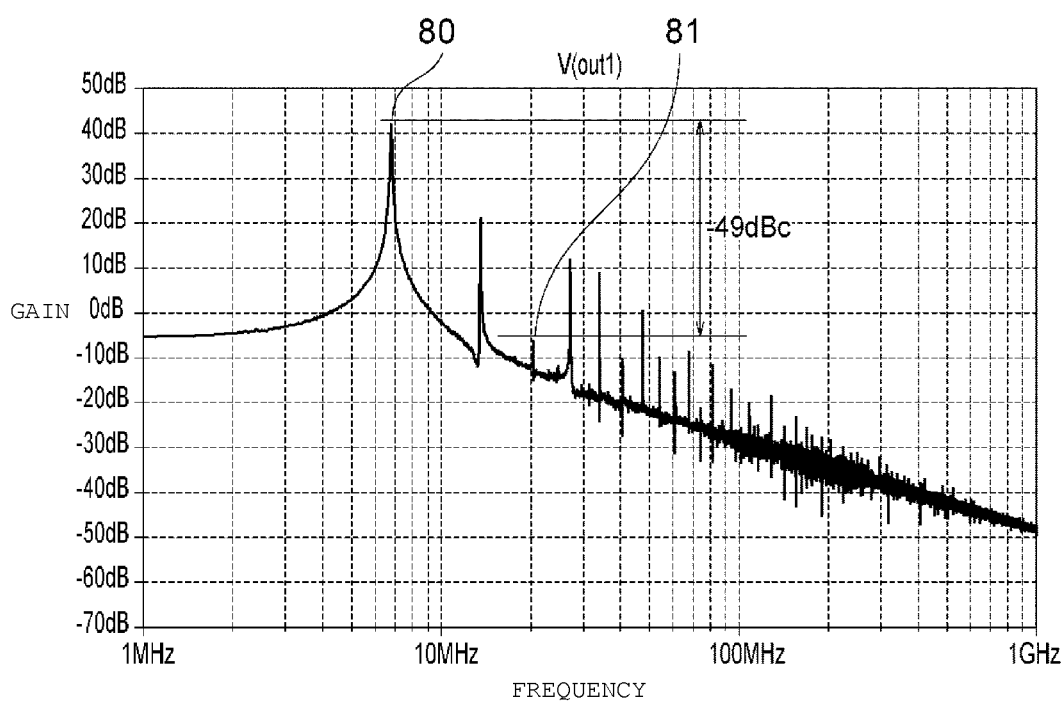
FIG. 5 is a diagram obtained by performing a Fast Fourier Transform on the voltage waveform of the power transmission coil in the non-contact power supply device according to the first embodiment.

FIG. 4 illustrates a simulation waveform of a voltage that is applied to the power transmission coil 12. In FIG. 4, a horizontal axis represents a time, and a vertical axis represents a voltage. The simulation waveform of the voltage is set as 6.78 MHz, which is formed into a slightly rounded shape. FIG. 5 illustrates a waveform obtained by performing Fast Fourier Transform (FFT) on a voltage waveform. In FIG. 5, a horizontal axis represents a frequency, and a vertical axis represents gain.

A difference between the fundamental wave 80 (6.78 MHz) and a third harmonic wave 81 (20.34 MHz) is set as 49 decibels (dB) by the serial LC resonant circuit 60 that is arranged in parallel with the power transmission coil 12. That is, the third harmonic wave 81 is reduced with respect to the fundamental wave by 49 dB.

When qualitatively describing this effect, the serial LC resonant circuit has low impedance at the resonance frequency. In the vicinity of the resonance frequency of the low impedance, the voltage generated in the power transmission circuit 11 is almost grounded without being applied to the power transmission coil 12. In contrast, the serial LC resonant circuit has high impedance with respect to a frequency other than the resonance frequency, such as the fundamental frequency, and thus has no effect on the voltage waveform. For this reason, with only slight adjustment of the resonance frequency, it is possible to operate the E class amplifier.

In the exemplary embodiment, a configuration in which the fundamental frequency is 6.78 MHz and the third harmonic wave of 20.34 MHz is not easily radiated from the power transmission coil 12 is described. However, the frequency is not particularly limited to be 6.78 MHz, but other frequencies can also be used. Further, the resonance frequency of the serial LC resonant circuit that is inserted parallel with the power transmission coil 12 is not limited to the third harmonic wave.

The circuit in which one MOSFET is used as a switching element is described above. However, more than one MOSFET can be used, and other switching elements may be used. In addition, the power transmission circuit may be configured to use two or more switching elements, such as a half bridge configuration. In a case of the half bridge configuration, the MOSFET is used instead of the choke coil 32 and two MOSFETs are controlled to be alternatively turned on.

The ZVS as an example of the soft switching described above. However, the example of the soft switching is not limited to the ZVS, but the ZCS may also be performed as the soft switching.

With such a configuration described above, in the non-contact power supply device which uses the amplifier that performs the soft switching and includes the serial LC resonant circuit as the power transmission circuit, it is possible to suppress the harmonic wave noise that is radiated from the power transmission coil by using a simple configuration.

(Second Embodiment)

In the second embodiment, a non-contact power supply device that may reduce not only one harmonic wave noise, but also a plurality of harmonic waves will be described.

Figure 6:
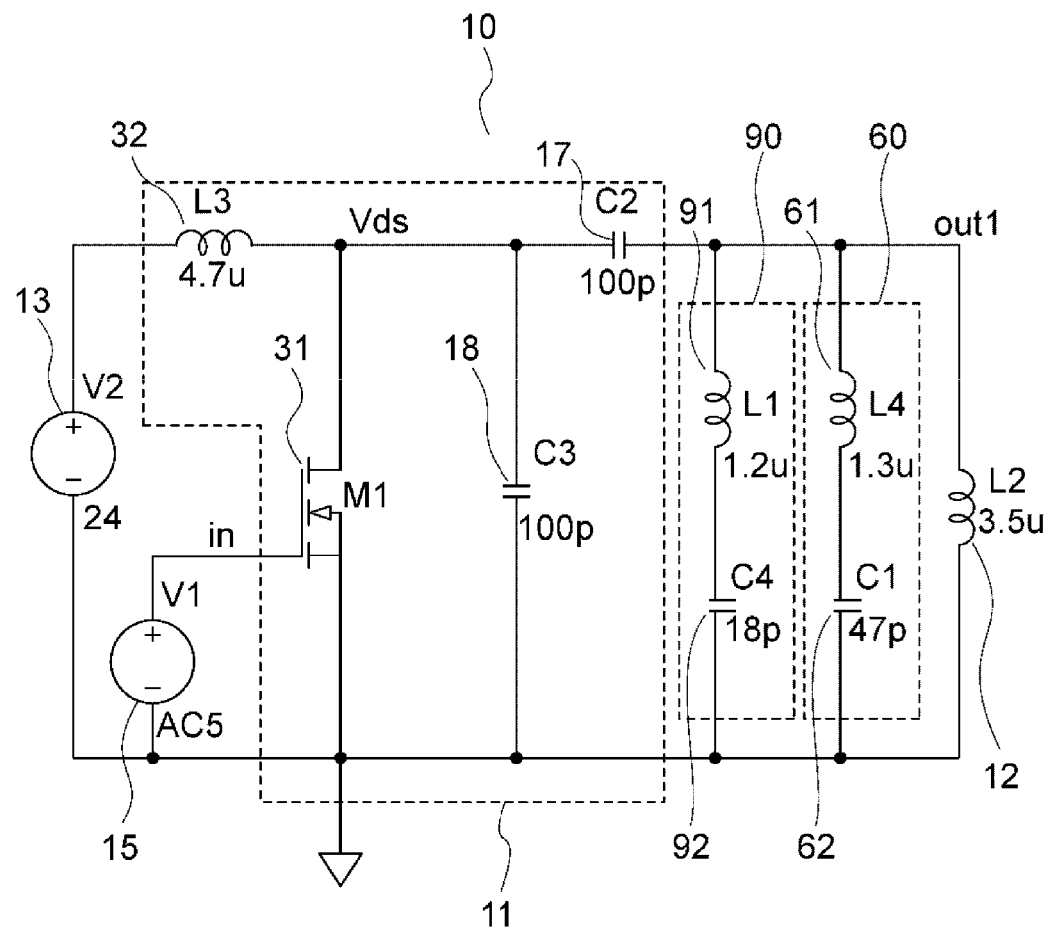
FIG. 6 is a configuration diagram schematically illustrating a power transmission circuit in a non-contact power supply device according to a second embodiment.

FIG. 6 is a configuration diagram of the non-contact power supply device 10 illustrating the second embodiment.

The fundamental frequency that is required to switch the MOSFET 31 is 6.78 MHz as in the first embodiment. In order to reduce the harmonic wave noise that is radiated from the power transmission coil 12, two serial LC resonant circuits 60 and 90 in which the inductor and the capacitor are connected to each other in series are provided in parallel with the power transmission coil 12. The serial LC resonant circuit 60 resonates at the third harmonic wave of 20.34 MHz in the same manner as described in the first embodiment. The inductor 61 is set as 1.3 μH, and the capacitor 62 is set as 47 pF in such a manner that the serial LC resonant circuit 60 resonates at the third harmonic wave of 20.34 MHz. The serial LC resonant circuit 90 selects a constant so as to resonate at a fifth harmonic wave of 33.9 MHz. The serial LC resonant circuit 90 is configured such that an inductor 91 of 1.2 μH and the capacitor 92 of 18 pF are connected to each other in series. A value of a resonance frequency (f90) is 33.9 MHz which is calculated by the following Equation:

$$f90 = 1/2\pi\sqrt{LC} = 34.26 \text{ MHz} \approx 33.9 \text{ MHz}$$

With respect to the fundamental wave of 6.78 MHz, the serial LC resonant circuits 60 and 90 have sufficiently high impedance. Since the serial LC resonant circuits 60 and 90 have sufficiently high impedance, the influence on the resonance operation of the power transmission circuit 11 is reduced even in a case where the serial LC resonant circuits 60 and 90 are inserted in parallel with the power transmission coil 12. In the second embodiment in which the two serial LC resonant circuits 60 and 90 are arranged in parallel with the power transmission coil 12, it is possible to operate the circuit as a class E amplifier by only changing the constant of the capacitor 17 as illustrated in FIG. 2 from 125 pF to 100 pF.

Figure 7:
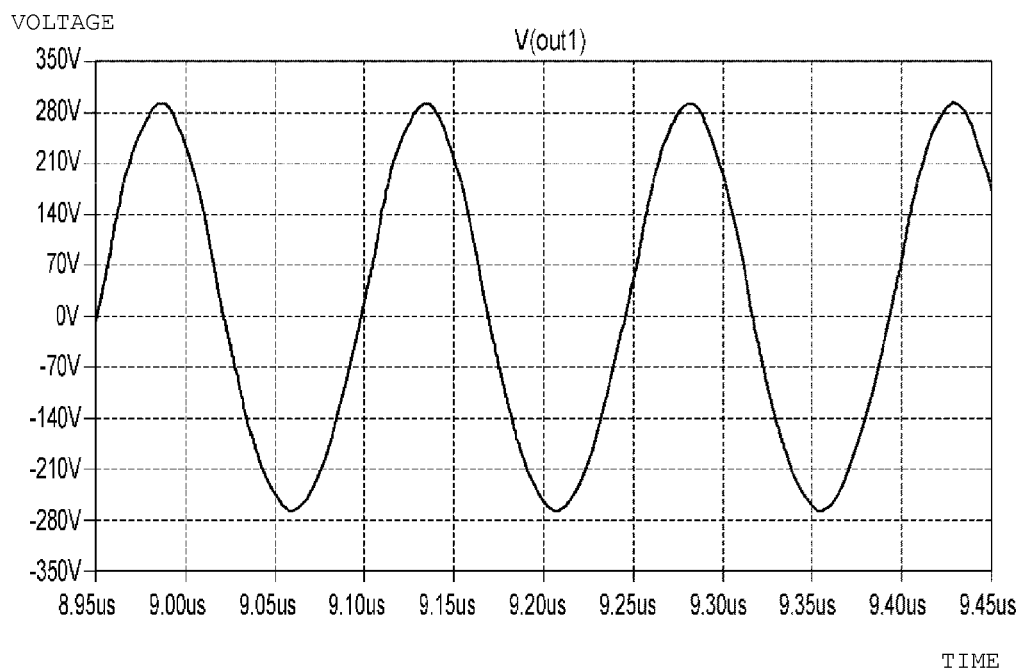
FIG. 7 is a diagram illustrating a voltage waveform of a power transmission coil in the non-contact power supply device according to the second embodiment.
Figure 8:
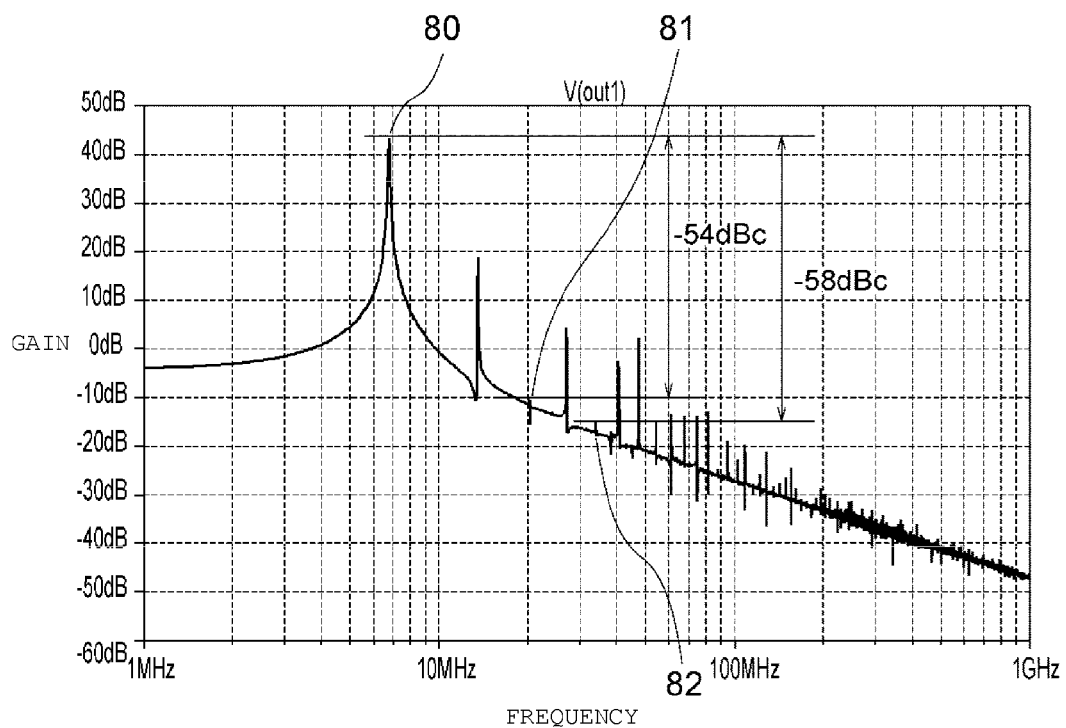
FIG. 8 is a diagram obtained by performing a Fast Fourier Transform on the voltage waveform of the power transmission coil in the non-contact power supply device according to the second embodiment.

FIG. 7 illustrates a waveform of a voltage that is applied to the power transmission coil 12, and when compared with the voltage waveform as illustrated in FIG. 4 in the first embodiment, the voltage waveform is nearer to a sine wave. That is, it is considered that the harmonic wave components are reduced. FIG. 8 is a diagram obtained by performing Fast Fourier Transform on the voltage waveform in the second embodiment. A vertical axis represents gain, and a horizontal axis represents a frequency. From FIG. 8, it is found that the components of the third harmonic wave 81 and the components of a fifth harmonic wave 82 are greatly reduced with respect to the fundamental wave 80 (6.78 MHz). In comparison to the fundamental wave 80, the level of the fundamental wave 80 is decreased, for example, the levels are respectively 54 dB at the third harmonic wave 81, and 58 dB at the fifth harmonic wave 82.

In the second embodiment, the non-contact power supply device 10 includes the two serial LC resonant circuits 60 and 90, which respectively include the inductor and the capacitor, and are parallel to the power transmission coil 12. It is possible to remove frequency components corresponding to the respective resonance frequencies of the serial LC resonant circuits 60 and 90 from the waveform of the voltage that is applied to the power transmission coil 12 by the serial LC resonant circuits 60 and 90. As a result, it is possible to reduce the third harmonic wave noise or the fifth harmonic wave noise that is radiated from the power transmission coil 12 when supplying the electric power in the non-contact state. It is possible to further provide the serial LC resonant circuit, which removes a specific frequency component, in parallel with the power transmission coil 12 in addition to the serial LC resonant circuits 60 and 90. In addition, a serial LC resonant circuit that resonates at a certain frequency may be inserted instead of the harmonic wave component.

The serial LC resonant circuit has high impedance with respect to the fundamental wave, and thus there is an advantage that it is not likely to affect the resonance operation of the fundamental wave. Therefore, the serial LC resonant circuit is a preferable configuration from the viewpoint that it is easy to operate the soft switching such as the ZVS in the power transmission circuit 11.

Figure 9:
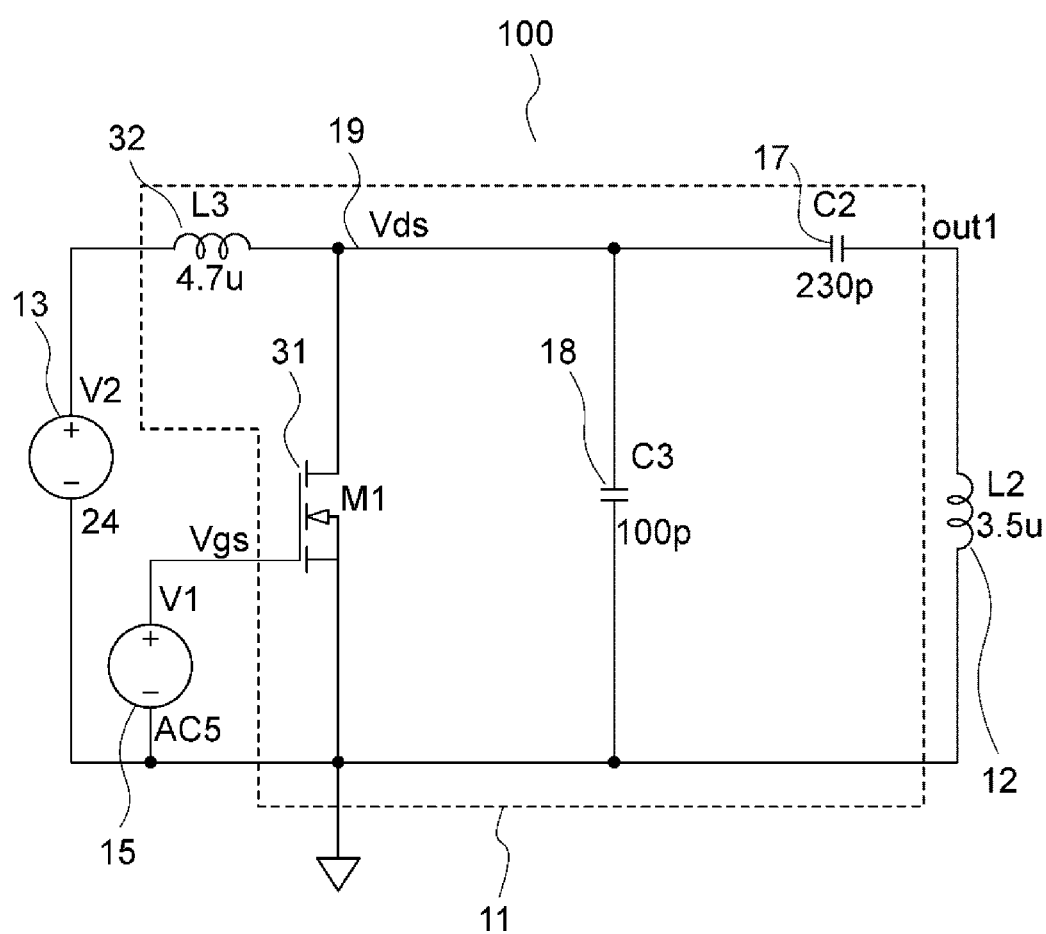
FIG. 9 is a configuration diagram schematically illustrating a power transmission circuit in a non-contact power supply device.
Figure 10:
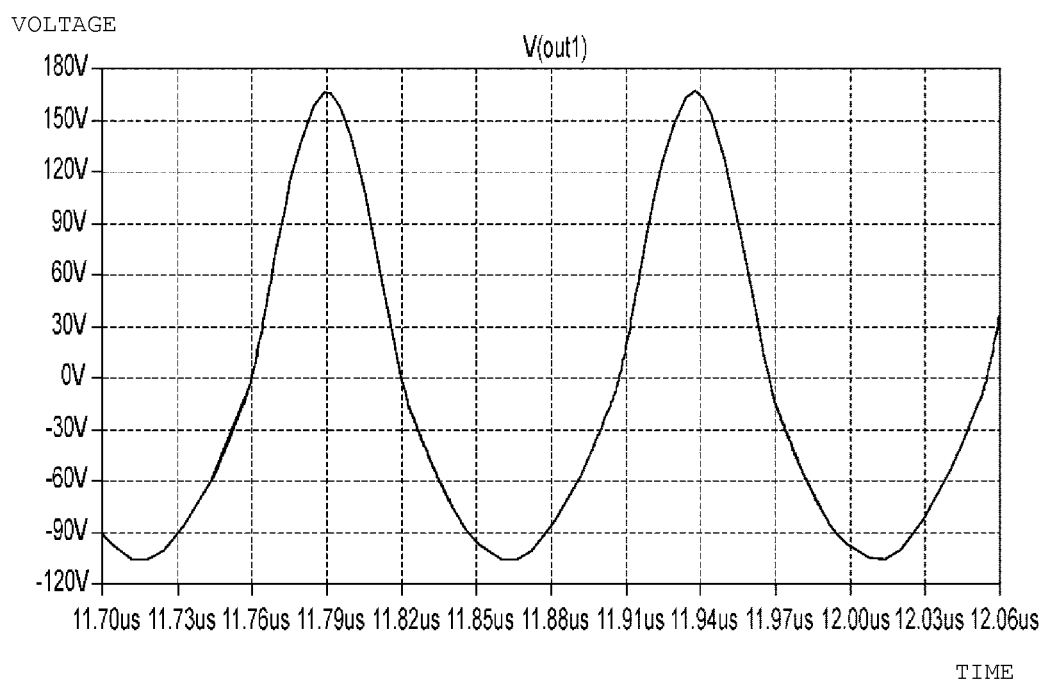
FIG. 10 is a diagram illustrating a voltage waveform of a power transmission coil in the non-contact power supply device of FIG. 9.
Figure 11:
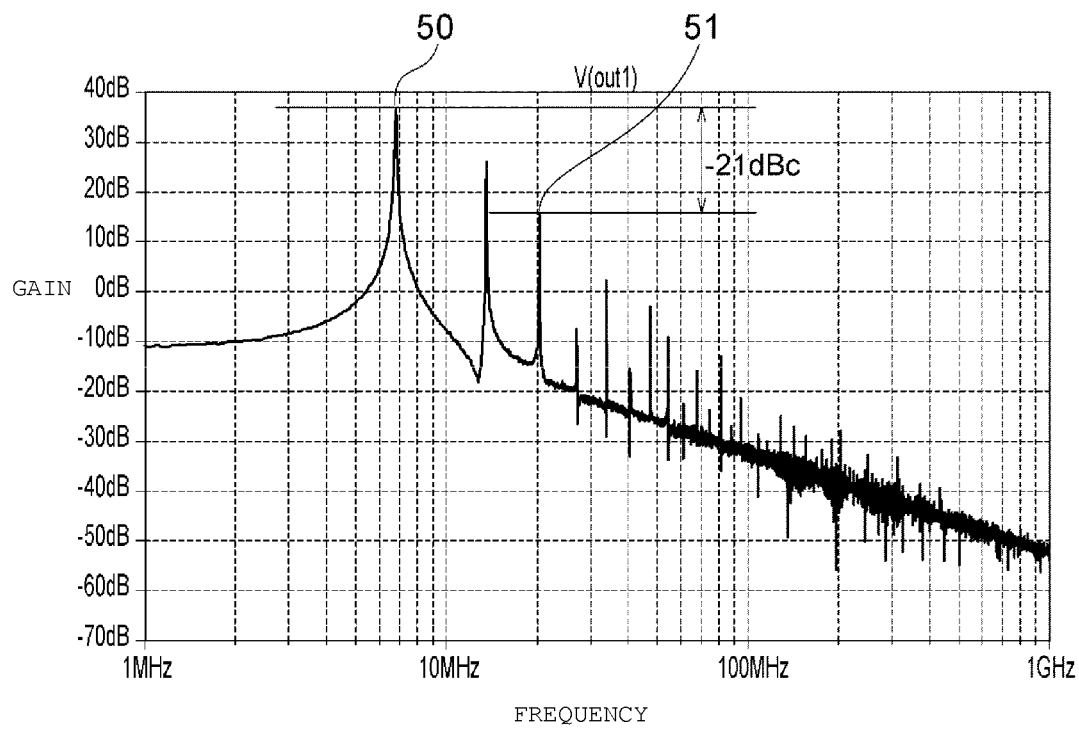
FIG. 11 is a diagram obtained by performing a Fast Fourier Transform on the voltage waveform of the power transmission coil in the non-contact power supply device of FIG. 9.

For comparison, FIG. 9 illustrates a circuit 100 of the non-contact power supply device which does not include the serial LC resonant circuit. The circuit 100 in FIG. 9 is configured in the same as the circuit configuration illustrated in FIG. 2 except that the serial LC resonant circuit 60 in FIG. 2 is removed and the capacitor 17 is changed from 125 pF to 230 pF. The circuit 100 changes the capacitor 17 from 125 pF to 230 pF, and resonates at the fundamental wave of 6.78 MHz. FIG. 10 illustrates a waveform of voltage that is applied to the power transmission coil 12 by the circuit 100. FIG. 11 is a diagram obtained by performing a Fast Fourier Transform on the voltage waveform.

The circuit 100 in the non-contact power supply device is configured to resonate at the switching frequency of 6.78 MHz, and the waveform of voltage that is applied to the power transmission coil 12 is formed into a sine wave shape. However, the circuit 100 includes a large number of harmonic wave components. As illustrated in FIG. 11, it is found that the circuit 100 includes a large number of the harmonic wave components in addition to a fundamental wave 50 of 6.78 MHz and the second or third harmonic wave. At a third harmonic wave 51 (20.34 MHz), the gain is reduced only by 21 dB with respect to the fundamental wave 50.

In order to commercialize the non-contact power supply device, it is necessary to satisfy a regulation value for a radiation noise (EMI) in each country. In consideration of the frequency of 30 MHz or lower, which is a regulation value for a conduction noise or the like, the switching frequency of 6.78 MHz satisfies the international Industry Science Medical (ISM) frequency and thus the regulation for the value of frequency is satisfied. The ISM frequency means a frequency for industry science medical. In addition, since the frequency of 13.56 MHz, which is double the frequency of 6.78 MHz, and the frequency of 27.12 MHz, which is four times as great as the frequency of 6.78 MHz, are also within a range of the ISM frequency, the regulation for the value of frequency is satisfied. On the other hand, since the harmonic wave of 20.34 MHz, which is three times as great as the frequency of 6.78 MHz, is not within the range of the ISM frequency, it is necessary to suppress the radiation noise to be reduced.

The noise radiated from the non-contact power supply device 100 is particularly radiated from the power transmission coil 12, and it is necessary to remove harmonic wave strain from the electric power that is added to the power transmission coil 12. A method described in the exemplary embodiment is possible to greatly reduce the noise generated at a specific frequency, such as the third harmonic wave or the fifth harmonic wave, and has great effect on the noise reduction.

In the first embodiment, the third harmonic wave 81 may be reduced by 49 dB with respect to the fundamental wave 80 by employing a configuration in which the serial LC resonant circuit 60 is inserted in parallel with the power transmission coil 12. In contrast, in the circuit 100, which does not include the serial LC resonant circuit, the third harmonic wave 51 is reduced by about 21 dB with respect to the fundamental wave 50 (6.78 MHz). In other words, in the first embodiment, the level of the third harmonic wave of the circuit that includes the serial LC resonant circuit may be reduced by 28 dB compared with the circuit 100 that does not include the serial LC resonant circuit. In addition, in the second embodiment, the level of the third harmonic wave of the circuit that includes the serial LC resonant circuit may be reduced by no less than 33 dB, as compared with the circuit 100 that does not include the serial LC resonant circuit.

In a case where the switching frequency of the fundamental wave is 6.78 MHz, when it is possible to remove the third harmonic wave of 20.34 MHz with respect to the noise of 30 MHz or lower, it is likely to satisfy the EMI regulation. In other words, as long as the harmonic wave at a specific frequency may be reduced or removed in consideration of the ISM frequency, it is possible to provide a non-contact power supply device that satisfies the EMI regulation. In the exemplary embodiment, it is possible to achieve a non-contact power supply device that suppresses the harmonic wave to satisfy the EMI regulation by employing a simple circuit configuration.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A non-contact power supply device, comprising:
    a power transmission coil;
    a power transmission circuit switchably coupling a voltage source and the power transmission coil, the power transmission circuit configured to resonate at a fundamental frequency; and
    a serial LC resonant circuit that includes a resonant inductor, is in parallel with the power transmission coil, and is configured to resonate at a frequency of a harmonic wave of the fundamental frequency,
    wherein electric power is supplied to a power reception coil from the power transmission coil through electromagnetic coupling, and
    the serial LC resonant circuit and the power transmission coil constitute a closed loop circuit that does not include a resonant inductor other than the resonant inductor of the serial LC resonant circuit.

2. The non-contact power supply device according to claim 1, wherein the power transmission circuit comprises:
    a switching element;
    a first capacitor coupled in parallel with the switching element; and
    a series connection of a second capacitor and the power transmission coil in parallel with the first capacitor.

3. The non-contact power supply device according to claim 2, further comprising a choke coil connected between the voltage source and the switching element.

4. The non-contact power supply device according to claim 2, wherein the switching element comprises a metal-oxide semiconductor field effect transistor (MOSFET).

5. The non-contact power supply device according to claim 2, further comprising an oscillation circuit configured to turn on and off the switching element.

6. The non-contact power supply device according to claim 1, further comprising:
    at least one additional serial LC resonant circuit in parallel with the power transmission coil.

7. The non-contact power supply device according to claim 1, wherein
    the fundamental frequency is 6.78 MHz, and
    the serial LC resonant circuit resonates at a third harmonic wave.

8. A non-contact power supply device, comprising:
    a power source;
    a power transmission coil configured to supply electric power in a non-contact state;
    a power transmission circuit switchably coupling the power source and the power transmission coil, the power transmission circuit including a choke coil that is connected to the power source, a switching element that is connected to the choke coil, a first capacitor that is connected in parallel with the switching element, a second capacitor that is connected between the power transmission coil and a contact point between the switching element and the choke coil, and a resonance circuit in which the first and second capacitors and the power transmission coil resonate at a fundamental frequency; and
    a serial LC resonant circuit in parallel with the power transmission coil, the serial LC resonant circuit configured to resonate at a frequency of a harmonic wave of the fundamental frequency,
    wherein electric power is supplied to a power reception coil from the power transmission coil through electromagnetic coupling.

9. The non-contact power supply device according to claim 8, further comprising:
    at least one additional serial LC resonant circuit in parallel with the power transmission coil.

10. The non-contact power supply device according to claim 9, wherein
    the fundamental frequency is 6.78 MHz,
    the serial LC resonant circuit resonates at a third harmonic wave, and
    a second serial LC resonant circuit of the at least one additional serial LC resonant circuit resonates at a fifth harmonic wave.

11. The non-contact power supply device according to claim 8, wherein
    the fundamental frequency is 6.78 MHz, and
    the serial LC resonant circuit resonates at a third harmonic wave.

12. The non-contact power supply device according to claim 8, wherein the switching element comprises a metal-oxide semiconductor field effect transistor (MOSFET).

13. The non-contact power supply device according to claim 8, further comprising an oscillation circuit configured to turn on and off the switching element.

14. The non-contact power supply device according to claim 13, further comprising:
    a voltage conversion circuit connected between the power source and the oscillation circuit.

15. A method of non-contact power transmission from a power transmission coil to a power reception coil, wherein a serial LC resonant circuit is connected in parallel with the power transmission coil, the method comprising:
    operating a power transmission circuit to switchably couple a power source and the power transmission coil, the power transmission circuit resonating at a fundamental frequency causing the serial LC resonant circuit to resonate at a frequency of a harmonic wave of the fundamental frequency; and supplying electric power from the power transmission coil to the power reception coil through electromagnetic coupling, wherein the serial LC resonant circuit includes a resonant inductor, and the serial LC resonant circuit and the power transmission coil constitute a closed loop circuit that does not include a resonant inductor other than the resonant inductor of the serial LC resonant circuit.

16. The method according to claim 15, wherein at least one additional serial LC resonant circuit is connected in parallel with the power transmission coil, and wherein the operation of the power transmission circuit causes the at least one additional serial LC resonant circuit to resonate at least one additional harmonic of the fundamental frequency.

17. The method according to claim 16, wherein
the fundamental frequency is 6.78 MHz,
the serial LC resonant circuit resonates at a third harmonic wave, and
a second serial LC resonant circuit of the at least one additional serial LC resonant circuit resonates at a fifth harmonic wave.

18. The method according to claim 15, wherein
the fundamental frequency is 6.78 MHz, and
the serial LC resonant circuit resonates at a third harmonic wave.

19. The method according to claim 15, wherein the power reception coil is coupled in series with a capacitor, and wherein a resonant circuit comprising the power reception coil and the capacitor resonates at substantially the same frequency as the fundamental frequency.

20. The method according to claim 19, further comprising:

coupling the electric power from the power reception coil to a load circuit.

* * * * *